(12) United States Patent
Miguchi

(10) Patent No.: US 6,817,263 B2
(45) Date of Patent: Nov. 16, 2004

(54) TRANSMISSION LEVER UNIT FOR VEHICLE AND MOUNTING STRUCTURE OF COIL SPRING

(75) Inventor: Akio Miguchi, Kobe (JP)

(73) Assignee: Kawasaki Jukogyo Kabushiki Kaisha, Kobe (JP)

( * ) Notice: Subject to any disclaimer, the term of this patent is extended or adjusted under 35 U.S.C. 154(b) by 109 days.

(21) Appl. No.: 10/121,213

(22) Filed: Apr. 11, 2002

(65) Prior Publication Data

US 2002/0148319 A1 Oct. 17, 2002

(30) Foreign Application Priority Data

Apr. 17, 2001 (JP) ........................................ 2001-117892

(51) Int. Cl.⁷ .......................... B60K 20/00; B60K 17/00
(52) U.S. Cl. .............. 74/473.3; 74/473.19; 74/471 XY; 180/336
(58) Field of Search .......................... 74/473.3, 473.15, 74/473.19, 471 XY, 500.5; 180/336

(56) References Cited

U.S. PATENT DOCUMENTS

| | | | |
|---|---|---|---|
| 3,795,157 A | * 3/1974 | Campbell et al. ........... 477/165 |
| 4,583,417 A | * 4/1986 | Hurlow ..................... 74/473.15 |
| 4,630,500 A | * 12/1986 | Suzuki ..................... 74/473.15 |
| 4,671,131 A | * 6/1987 | Hurlow ................... 74/471 XY |
| 4,712,640 A | * 12/1987 | Leigh-Monstevens et al. ... 180/336 |
| 5,063,810 A | * 11/1991 | Fujii ....................... 74/473.15 |
| 5,287,743 A | * 2/1994 | Doolittle et al. ........ 74/471 XY |
| 5,679,452 A | * 10/1997 | Minagawa et al. ....... 428/313.3 |
| 5,706,702 A | * 1/1998 | Yamada .................... 74/473.15 |
| 5,870,929 A | * 2/1999 | Bravo ..................... 74/473.18 |
| 6,196,079 B1 | * 3/2001 | Paparoni .................. 74/473.15 |
| 6,435,054 B1 | * 8/2002 | Duckeck et al. .......... 74/473.34 |
| 6,581,490 B1 | * 6/2003 | Graus ...................... 74/473.15 |

FOREIGN PATENT DOCUMENTS

| | | |
|---|---|---|
| JP | 64-52937 | 3/1989 |
| JP | 2-008557 | 1/1990 |
| JP | 6-201038 | 7/1994 |
| JP | 08-337131 | 12/1996 |
| JP | 11-165551 | 6/1999 |

* cited by examiner

*Primary Examiner*—David A. Bucci
*Assistant Examiner*—Colby Hansen
(74) *Attorney, Agent, or Firm*—Kolisch Hartwell, PC

(57) ABSTRACT

Disclosed are a transmission lever unit for vehicle comprising: a single transmission lever for operating the transmission unit; a first lever member swingable around a first pivot and having a second pivot; and a second lever member integrally attached to a base end portion of the transmission lever and swingable around the second pivot orthogonal to the first pivot, the transmission lever unit being adapted to select a desired combination of gear trains of first and second systems of the transmission through independent connecting means of the first and second systems by an operation of the lever, wherein the first connecting means is adapted to operate by swing operation of the transmission lever around the first pivot, and the second connecting means is adapted to operate by swing operation of the transmission lever around the second pivot, and a mounting structure of a coil spring held by two members disposed such that at least part of the members are substantially parallel to each other, for elastically connecting the two members via the coil spring, the structure having openings at parts of the members which are substantially parallel to each other so as to overlap with each other as seen from one direction, and the coil spring disposed in the openings.

13 Claims, 16 Drawing Sheets

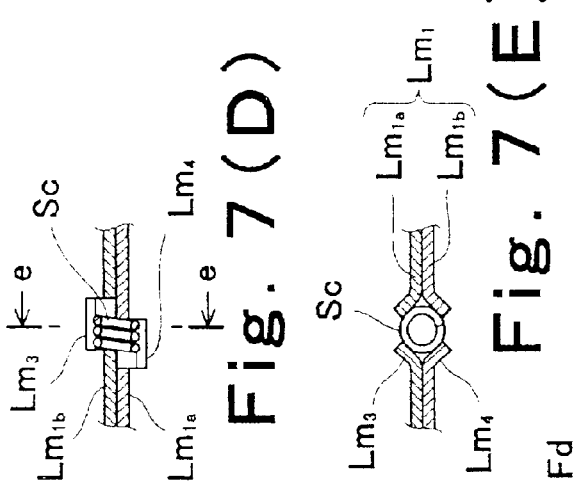
Fig. 7(D)
Fig. 7(E)
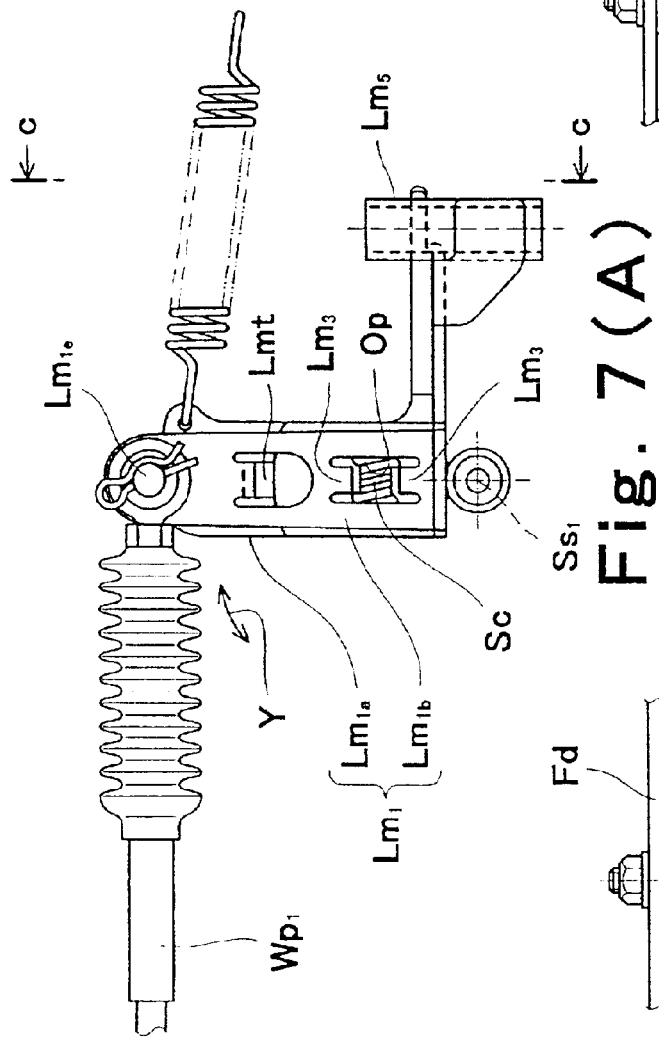
Fig. 7(A)
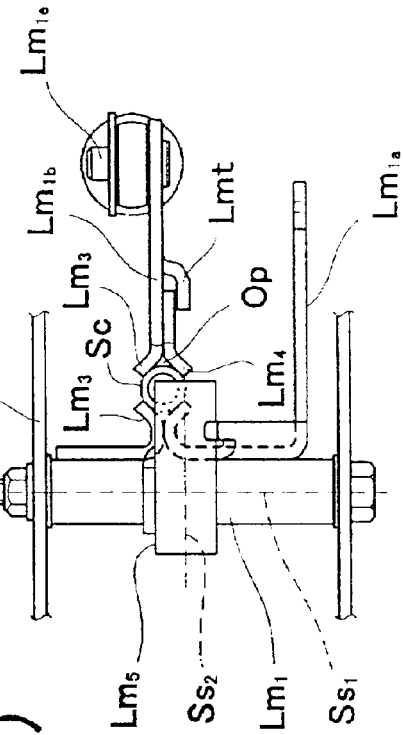
Fig. 7(C)
Fig. 7(B)

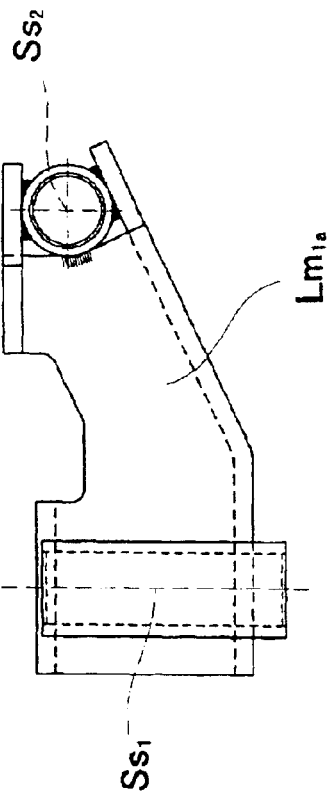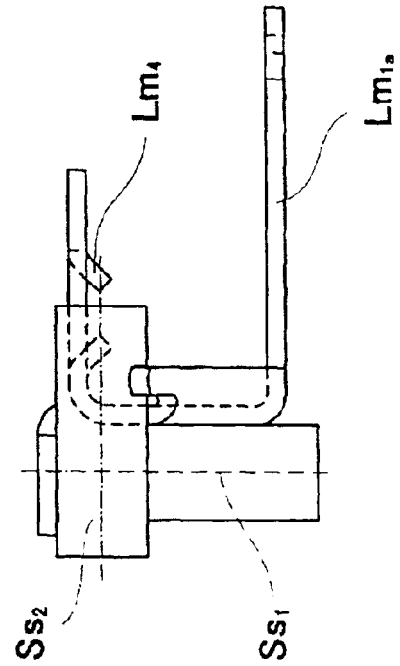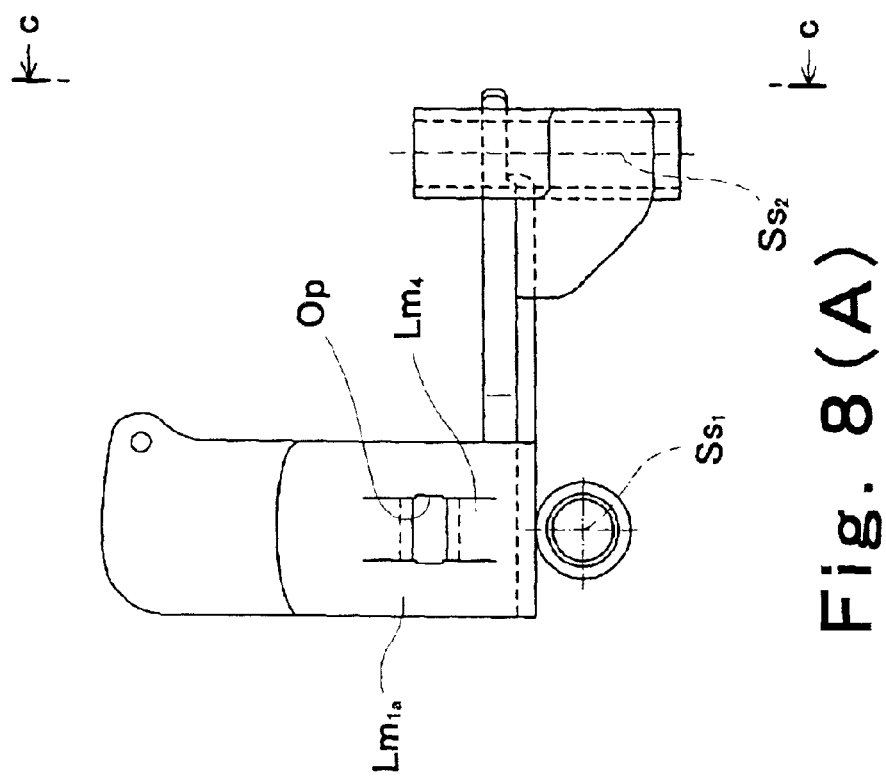

TRANSMISSION LEVER UNIT FOR VEHICLE AND MOUNTING STRUCTURE OF COIL SPRING

BACKGROUND OF THE INVENTION

1. Field of the Invention

The present invention relates to a transmission lever unit for vehicle (defined as a transmission lever unit in a broad sense, including a lever mechanism for switching between "forward" and "reverse" and "2WD" and "4WD" for operating a transmission (defined as a transmission in a broad sense, including a mechanism for switching between "forward" and "reverse" and between "2WD" and "4WD") of a vehicle such as a three-wheeled or four-wheeled utility (working) vehicle, a three-wheeled or four-wheeled leisure vehicle (hereinafter referred to as a small vehicle) enabling the operation by a driver seated on a driver's seat that is apart from the transmission, and a mounting structure of a coil spring suitable for use in the transmission lever unit.

2. Description of the Related Art

In the case of small vehicles, e.g., all-terrain vehicles including leisure and utility vehicles, a transmission has gear trains for a plurality of different systems, e.g., a gear train for changing a gear ratio (high-speed gear and low-speed gear), a gear train for switching between "forward" and "reverse", and a gear train for switching between "2WD" and "4WD".

In conventional all-terrain vehicles, operation levers are provided in the vicinity of a driver's seat for the respective gear trains for the plurality of systems.

When the operation levers are thus provided, the constitution around the driver's seat is complicated and the transmission lever unit for vehicle is correspondingly complicated.

Under the circumstances, Publication of Unexamined Patent Application No. Hei. 8-337131 discloses an operation lever unit in which the use of one operation lever enables the operations of connecting means, e.g., push-pull cables and connecting rods, for two systems.

This operation lever unit is constituted such that, while shifting operation for one of the systems is conducted by using one of the connecting means, the connecting means in the other system is free. In other words, while the switching operation between "forward" and "reverse" is being performed, the force of this operation does not act to maintain the current condition (e.g., high-speed gear) of the system for changing the gear ratio. Accordingly, it is necessary to increase a detent force of the operation lever unit for the purpose of maintaining the current condition of the gear train for the system which should not be operated. In that case, however, the lever needs to be operated by a force exceeding the detent force, so that a great force is required to operate the lever. As a result, operation of the operation lever feels heavy to the operator. In addition, in this constitution, high rigidity and precision are needed in respective members. This results in a heavyweight and expensive lever unit.

SUMMARY OF THE INVENTION

The present invention addresses the above-described conditions, and an object of the present invention is to provide a lightweight transmission lever unit for a vehicle that can be operated without an increase in an operation force and need not increase the rigidity of respective members. Another object of the present invention is to provide a mounting structure of a coil spring suitable for use in the transmission lever unit.

According to the present invention, there is provided a transmission lever unit for vehicle comprising: a single transmission lever for operating the transmission unit; a first lever member swingable around a first pivot and having a second pivot; and a second lever member integrally attached to a base end portion of the transmission lever and swingable around the second pivot orthogonal to the first pivot, the transmission lever unit being adapted to select a desired combination of gear trains of first and second systems of the transmission through independent connecting means of the first and second systems by operation of the transmission lever, wherein the first connecting means is adapted to operate by a swing operation of the transmission lever around the first pivot, and the second connecting means is adapted to operate by swing operation of the transmission lever around the second pivot.

In accordance with the transmission lever unit so constituted, the gear trains of the two systems can be independently operated by using one transmission (or operation) lever, and the shifting operation for one of the gear trains does not affect the shifting operation of the other gear train. Therefore, it is not necessary to increase an operation force applied to the operation lever and increase the rigidity of the respective members. This results in a lightweight transmission lever unit for a vehicle. More specifically, the operation lever is swung around the first pivot to cause the first connecting means to operate, thereby operating the first gear train of the transmission, while the operation lever is swung around the second pivot to cause the second connecting means to operate, thereby operating the other gear train of the transmission. So, during the swing operation around either the first pivot or the second pivot, the position of the other pivot side can be maintained as it is. Therefore, it is not necessary to provide a detent mechanism with a large detent force for maintaining the current condition on the first pivot side and the second pivot side. The use of this lever unit can reduce the operation force exerted by the operator for swinging the target side. As a result, it is not necessary to increase the rigidity of the respective members of the transmission lever unit for a vehicle, and a lever unit that could be lightweight and manufactured at a low cost is achieved. In addition, the swing operation around the second pivot does not affect the swing operation around the first pivot.

It is preferable that in the transmission lever unit for a vehicle, the second pivot is provided at a tip end of the first lever member, because this provides rational placement.

It is preferable that the transmission lever unit for a vehicle further comprises a third lever member swingable around a third pivot provided in a unit frame in parallel with the second pivot, the third lever member and the second lever member being connected by means of a connecting member, and the second connecting means is adapted to operate via the third lever member by swing operation of the operation lever around the second pivot. Thereby, the tip end of the second connecting means can be easily positioned in the vicinity of the first pivot and the second connecting means is hardly affected by the swing operation around the first pivot.

It is preferable that in the transmission lever unit for a vehicle, a tip end portion of the first connecting means is connected to a portion of the first lever member that is apart from the first pivot and a tip end portion of the second connecting means is connected to a portion of the third lever member that is apart from the third pivot. Thereby, the constitution enabling the shifting operation is attained.

It is preferable that in the transmission lever unit for a vehicle, the connecting member is comprised of a rigid member, and connecting elements having three degrees of freedom are respectively disposed at a connected portion of the connecting member and the third lever member and at a connected portion of the connecting member and the second member. Thereby, the third lever member is hardly affected by the swing operation of the first lever member around the first pivot.

It is preferable that in the transmission lever unit for a vehicle, the connecting elements are a ball-joint mechanism. Thereby, the power can be smoothly transmitted with three degrees of freedom.

It is preferable that in the transmission lever unit for a vehicle, the first pivot is provided substantially vertically and the second pivot is substantially horizontal.

It is preferable that in the transmission lever unit for a vehicle, at least one of the first lever member, the second lever member, and the third lever member, is comprised of two members coupled to each other by means of elastic means. Thereby, shocking force caused by the transmitting operation is alleviated by the elastic means, to and therefore, the operator can smoothly operate the lever.

It is preferable that in the transmission lever unit for a vehicle, the first system is a system for changing a gear ratio and the second system is a system for switching between forward and reverse.

It is preferable that in the transmission lever unit for a vehicle, at least one of the first lever member, the second member, and the third lever member includes a first plate member and a second plate member respectively provided with openings overlapping with each other as seen from one direction, and the elastic means is formed by disposing a spring in the openings. Thereby, sufficient elastic function is obtained with a simple constitution and a lightweight constitution is obtained.

It is preferable that in the transmission lever unit for a vehicle, the openings of the first plate member and the second plate member have substantially equal length. This constitution allows the deformation of the entire spring, e.g., the entire coil spring to be fully utilized for elastic function.

It is preferable that in the transmission lever unit for a vehicle, the spring is a coil spring, a convex portion for prevention of disengagement of the spring toward an opposite side of the second plate member is provided at a portion of the opening of the first plate member so as to extend toward the opposite side of the second plate member and a convex portion for prevention of disengagement of the spring toward an opposite side of the first plate member is provided at a portion of the opening of the second plate member so as to extend toward the opposite side of the first plate member. Thereby, the coil spring can be reliably held in the openings.

It is preferable that the convex portion is formed by two opposed bent portions.

It is preferable that in the transmission lever unit, the coil spring is held from its outer periphery by the convex portions provided at the openings of the first plate member and the second plate member. Thereby, the coil spring can be reliably and stably held in the openings from its outer periphery.

According to the present invention, there is also provided a mounting structure of a coil spring held by two members disposed such that at least part of the members are substantially parallel to each other, for elastically connecting the two members via the coil spring, the structure having openings at parts of the members which are substantially parallel to each other so as to overlap with each other as seen from one direction, and the coil spring disposed in the openings.

In accordance with the mounting structure of the coil spring, it is possible to realize the mounting structure of the coil spring capable of holding the coil spring simply and reliably by the two members that are substantially parallel to each other.

It is preferable that in the mounting structure of the coil spring, the two members are first and second plate members, the openings of the first plate member and the second plate member have substantially equal length, a convex portion for prevention of disengagement of the spring toward an opposite side of the second plate member is provided at a portion of the opening of the first plate member, so as to extend toward the opposite side of the second plate member and a convex portion for prevention of disengagement of the spring toward an opposite side of the first plate member is provided at a portion of the opening of the second plate member, so as to extend toward the opposite side of the first plate member. In this mounting structure, the coil spring can be reliably held in the openings in a simple manner.

It is preferable that in the mounting structure of a coil spring, the coil spring is held from its outer periphery by the convex portions provided at the openings of the first plate member and the second plate member. The coil spring can be reliably and stably held in the openings from its outer periphery.

It is preferable that in the mounting structure of a coil spring, the openings and the convex portions are formed by one pressing operation. Thereby, these portions can be formed speedily and at a low cost.

The above and further objects and features of the invention will more fully be apparent from the following detailed description with accompanying drawings.

BRIEF DESCRIPTION OF THE DRAWINGS

FIG. 7A is a plan view showing a constitution of a first lever member of the transmission lever unit of FIG. 4;

FIG. 7B is a side view showing the constitution of a first lever member of the transmission lever unit for vehicle of FIG. 4;

FIG. 7C is a view taken in the direction of arrows substantially along line c—c of FIG. 7A, and showing the constitution of the first lever member of the transmission lever unit for vehicle of FIG. 4;

FIG. 7D is a side view showing a constitution of the first lever member of the transmission lever unit for vehicle of FIG. 4, and partially showing a spring mounting portion;

FIG. 7E is a cross-sectional view taken in the direction of arrows substantially along line e—e of FIG. 7D;

FIG. 8A is a plan view showing a first member of the first lever member of FIGS. 7A–7E;

FIG. 8B is a side view showing the first member of the first lever member of FIGS. 7A–7E;

FIG. 8C is a view taken in the direction of arrows substantially along line c—c of FIG. 8A and showing the first member of the first lever member of FIGS. 7A–7E;

DETAILED DESCRIPTION OF THE PREFERRED EMBODIMENTS

Hereinafter, a transmission lever unit for a vehicle according to an embodiment of the present invention will be described. By way of example, a transmission lever unit mounted in a small four-wheeled utility (working) vehicle as a small vehicle will be described in detail with reference to drawings.

Figure 1:
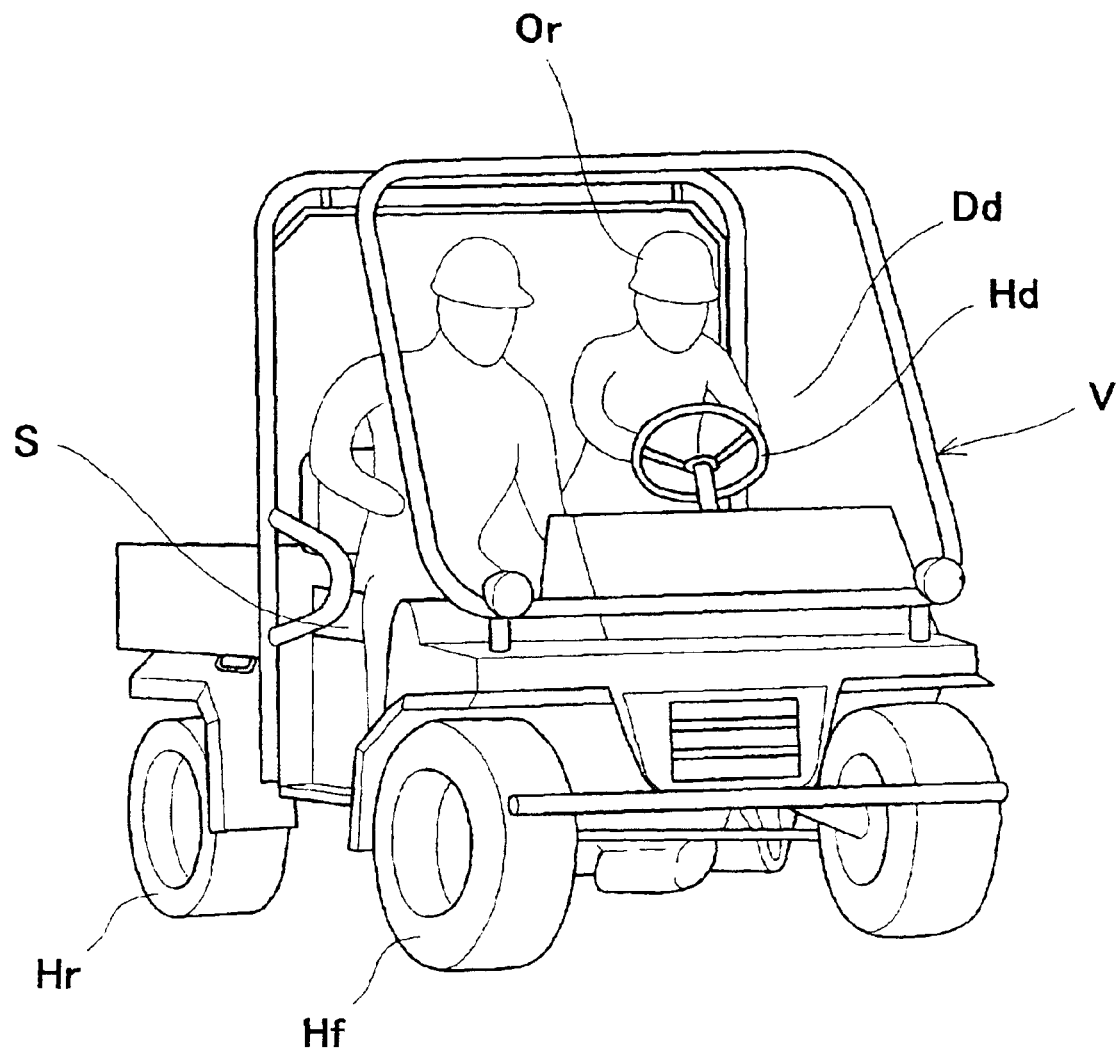
FIG. 1 is a perspective view seen from an oblique front direction, showing an entire constitution of a small four-wheeled utility vehicle according to an embodiment of the present invention.
Figure 2:
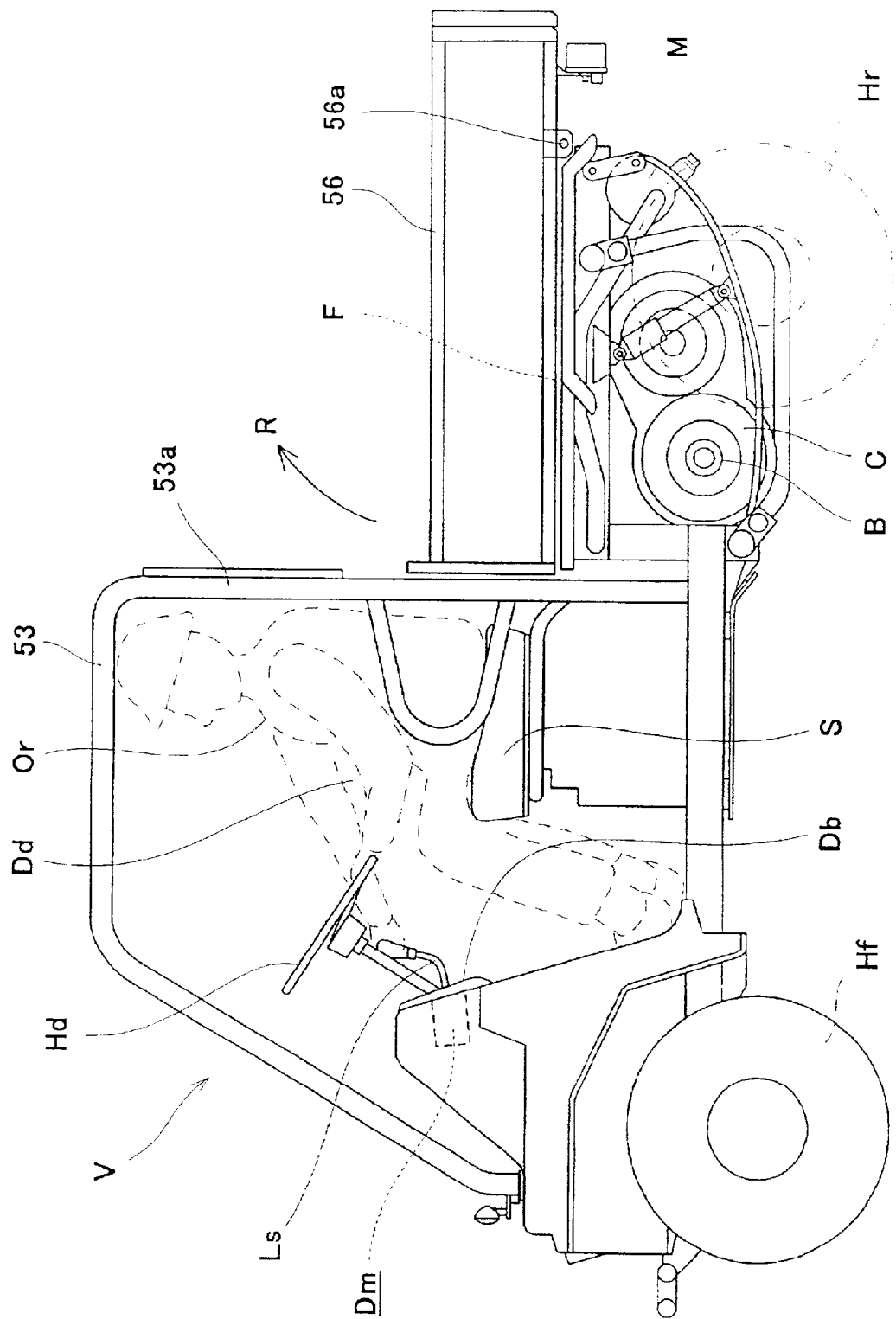
FIG. 2 is a side view showing the small four-wheeled utility vehicle of FIG. 1 in which rear wheels are represented by two-dot chain lines.
Figure 3:
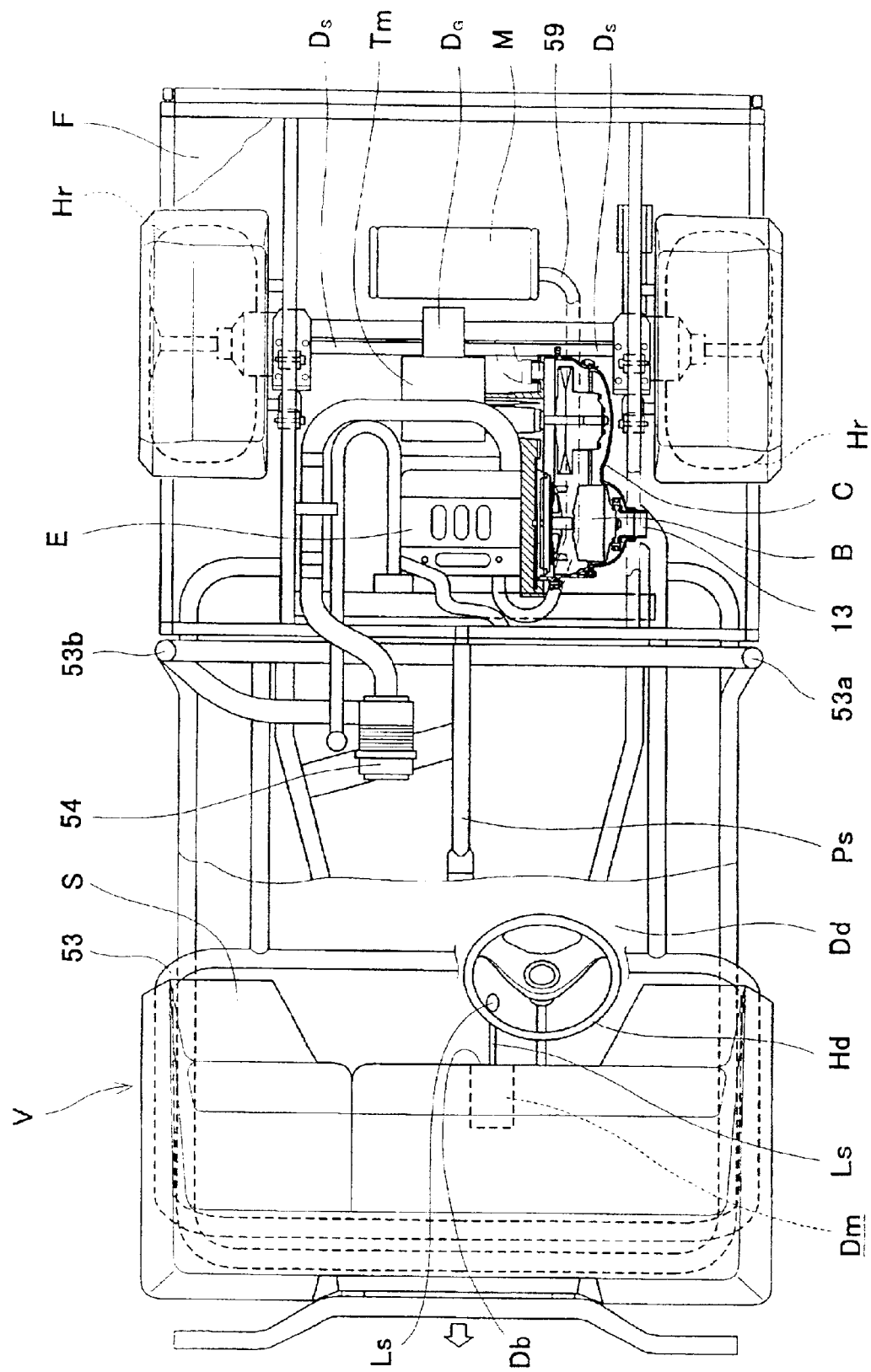
FIG. 3 is a plan view showing an entire constitution of the small four-wheeled utility vehicle in which a luggage deck of the vehicle of FIG. 1 is removed therefrom and an upper half portion of a cover of a belt converter is illustrated to be cut away.

Referring now to FIGS. 1–3, there is shown a small four-wheeled utility vehicle V. In vehicle V, power from an engine E placed behind a seat S and beneath a luggage deck is changed to have a desired speed by a belt converter B placed on the left side of the engine E (left side in the traveling direction) and a transmission Tm, and rear wheels Hr are driven via a differential gear DG and right and left drive shaft DS. Since the vehicle V is of a 4WD type, front wheels Hf can be also driven via a propeller shaft Ps (see FIGS. 3, 16) extended forwardly from the transmission Tm.

As shown in FIGS. 2, 3, the transmission Tm is remotely operated by a transmission lever unit Dm provided in the vicinity of a handle Hd of the driver's seat Dd. The transmission lever unit Dm is provided with a transmission lever Ls protruded from a dash board Db in front of the driver's seat Db in this embodiment, for being operated by an operator (driver) Or. A body portion of the transmission lever unit Dm is provided at the base end side of the transmission lever Ls, i.e., inside of the dash board Db.

Figure 16:
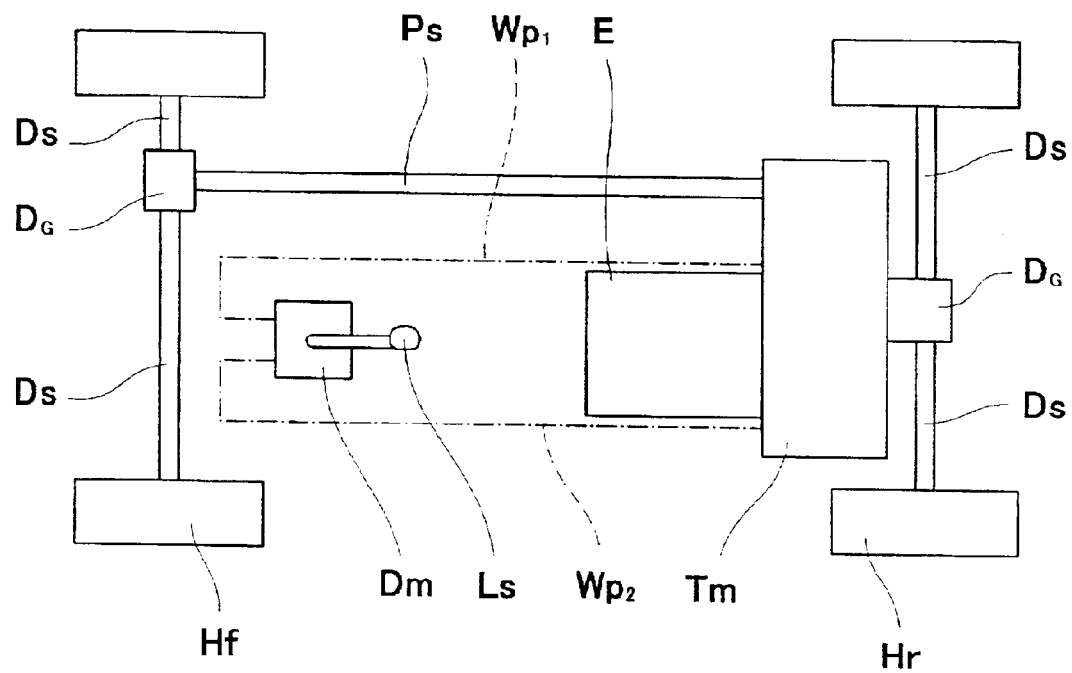
FIG. 16 is a plan view schematically showing a constitution of a power train of a vehicle comprising the transmission lever unit of FIGS. 4–6.

The operator Or uses the transmission lever unit Dm to select a gear train of the transmission Tm at the rear side of the vehicle via a push-pull wire ("connecting means") Wp1 or Wp2 (see FIG. 16). Specifically, the gear ratio ("high-speed gear" or "low-speed gear"), and "forward" or "reverse" is selected. The transmission lever unit Dm is constituted as described below.

Figure 4:
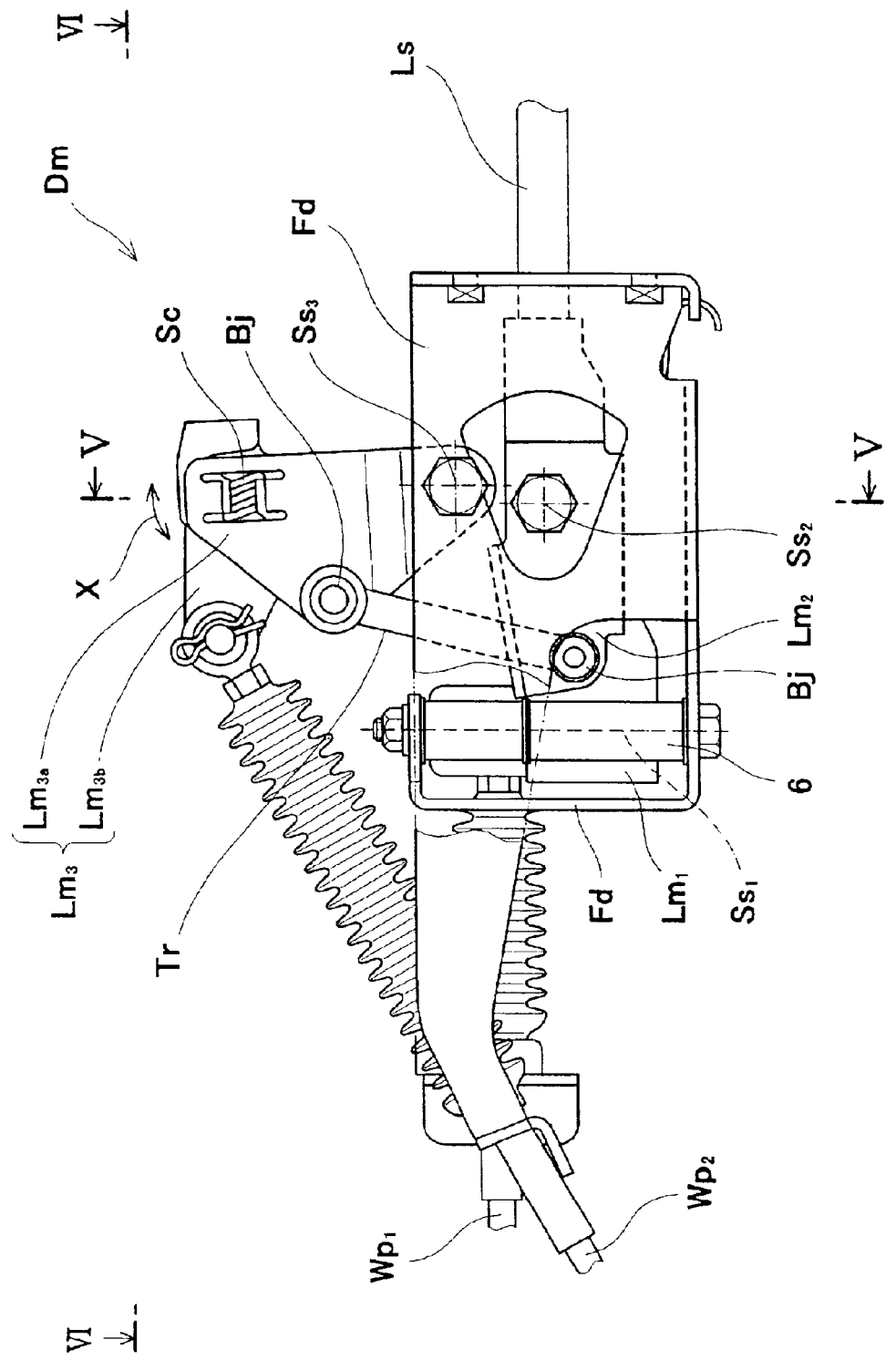
FIG. 4 is a side view partially showing a transmission lever unit for vehicle which is mounted in the small four-wheeled utility vehicle of FIGS. 1–3.
Figure 5:
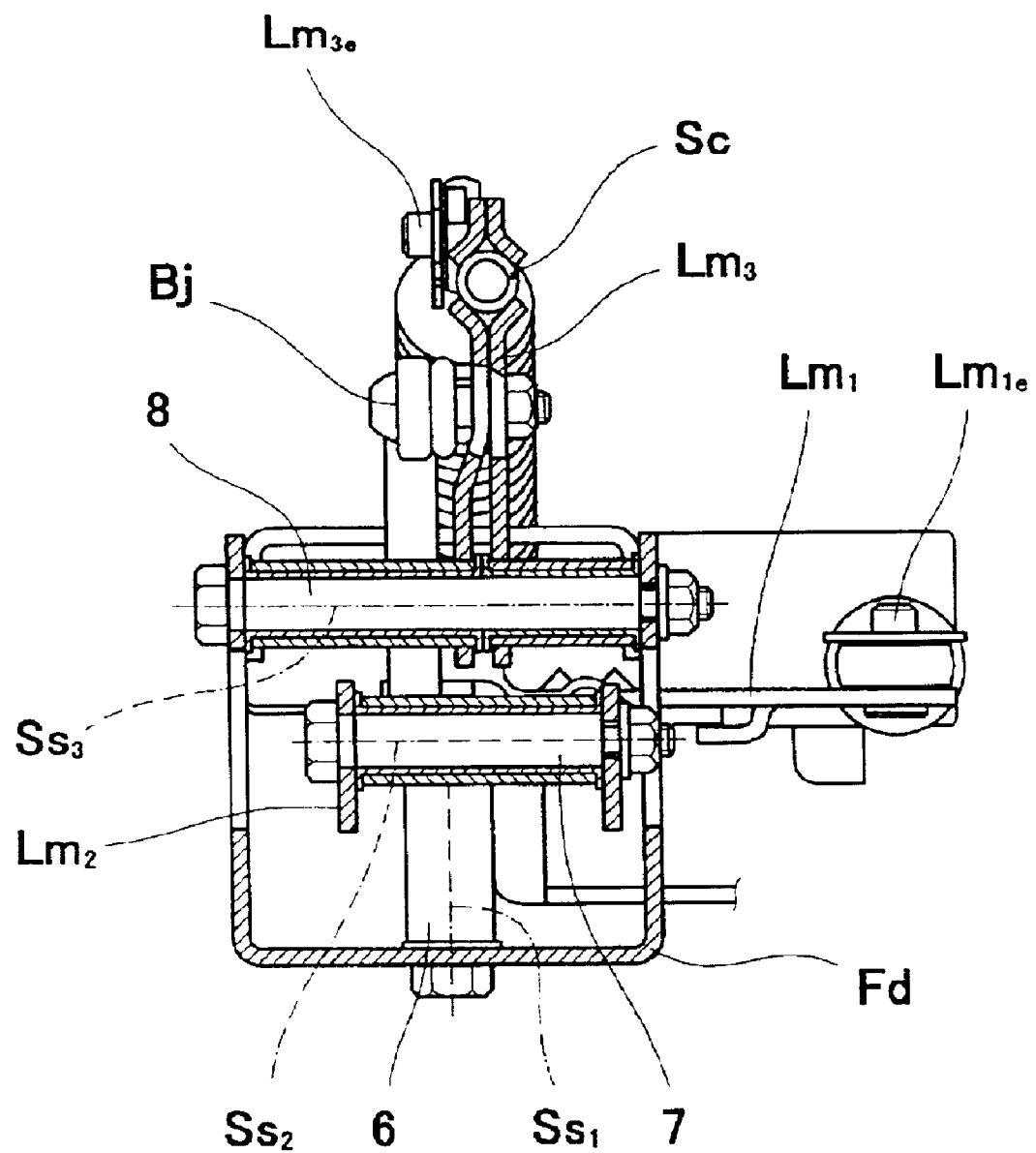
FIG. 5 is a cross-sectional view taken in the direction of arrows substantially along line V—V of FIG. 4.
Figure 6:
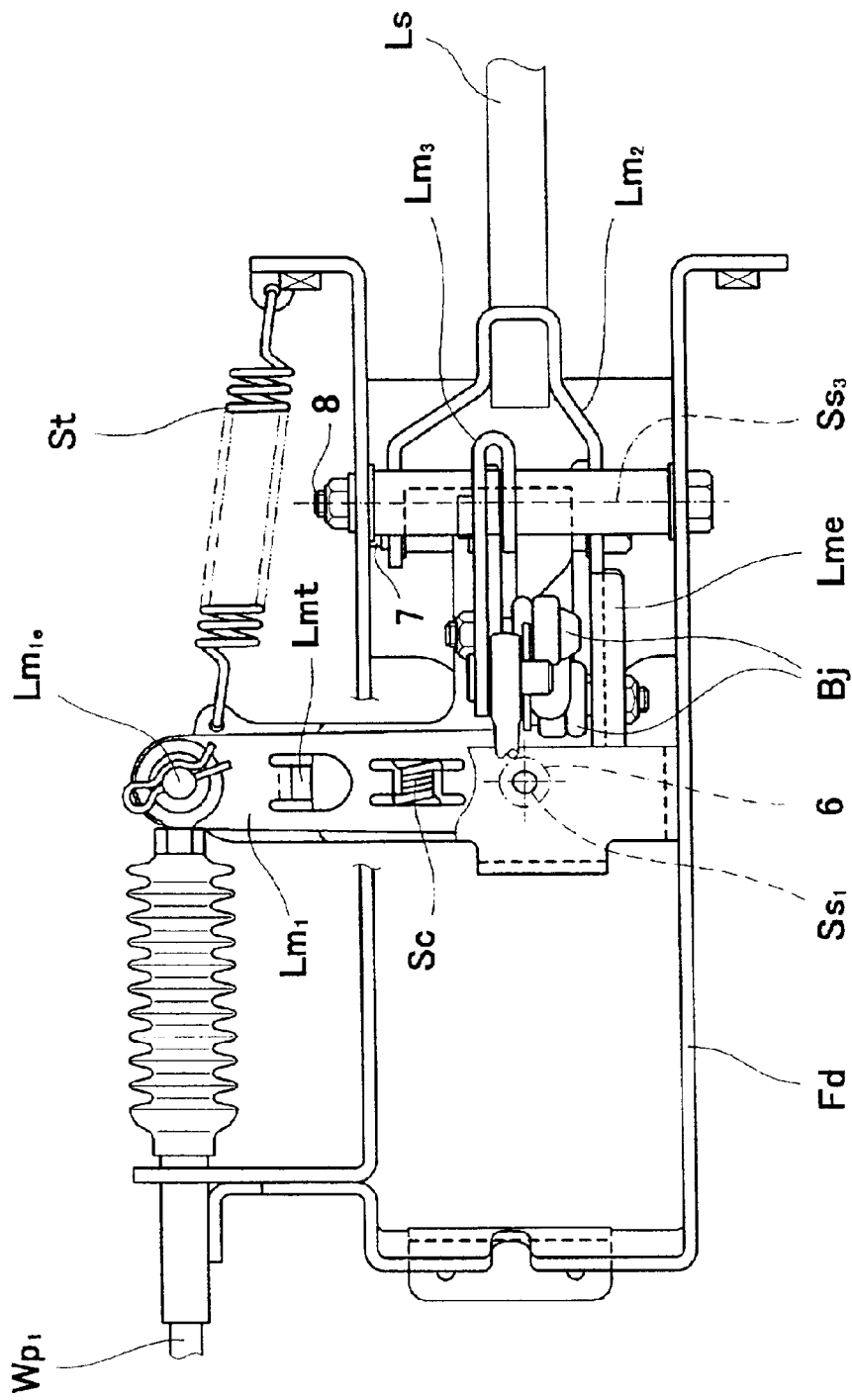
FIG. 6 is a plan view taken in the direction of arrows substantially along line VI—VI of FIG. 4.

Specifically, as shown in FIGS. 4–6, the transmission lever unit Dm comprises a unit frame Fd that is formed by pressing a plated-steel thin plate with a sheet metal press, and that is fixed to a vehicle body Fr (see FIGS. 2, 3). Transmission lever unit Dm further includes a first plated-steel lever member Lm1, a second plated-steel lever member Lm2, a third plated-steel lever member Lm3, a plated-steel tie rod Tr, a first pivot Ss1, a second pivot Ss2, and a third pivot Ss3, which are all mounted on the unit frame Fd. The first lever member Lm1 is swingable around the first pivot Ss1 comprised of a vertical shaft. The second lever member Lm2 is swingable around the second pivot Ss2 comprised of a horizontal shaft orthogonal to the first lever member Lm1. The third lever member Lm3 is swingable around the third pivot Ss3 located in parallel with the second pivot Ss2 at a neutral position (home position). The tie rod Tr is comprised of a rigid body connecting the third lever member Lm3 and the second lever member Lm2. As shown in FIG. 6, when no tensile force from the wire Wp1 is applied to the first lever member Lm1, the first lever member Lm1 is pulled to the right side of FIG. 6 by a spring St engaged at one end with the unit frame Fd so that a predetermined condition (e.g., high-speed gear) is maintained.

Figures 9A, 9B, 9C:
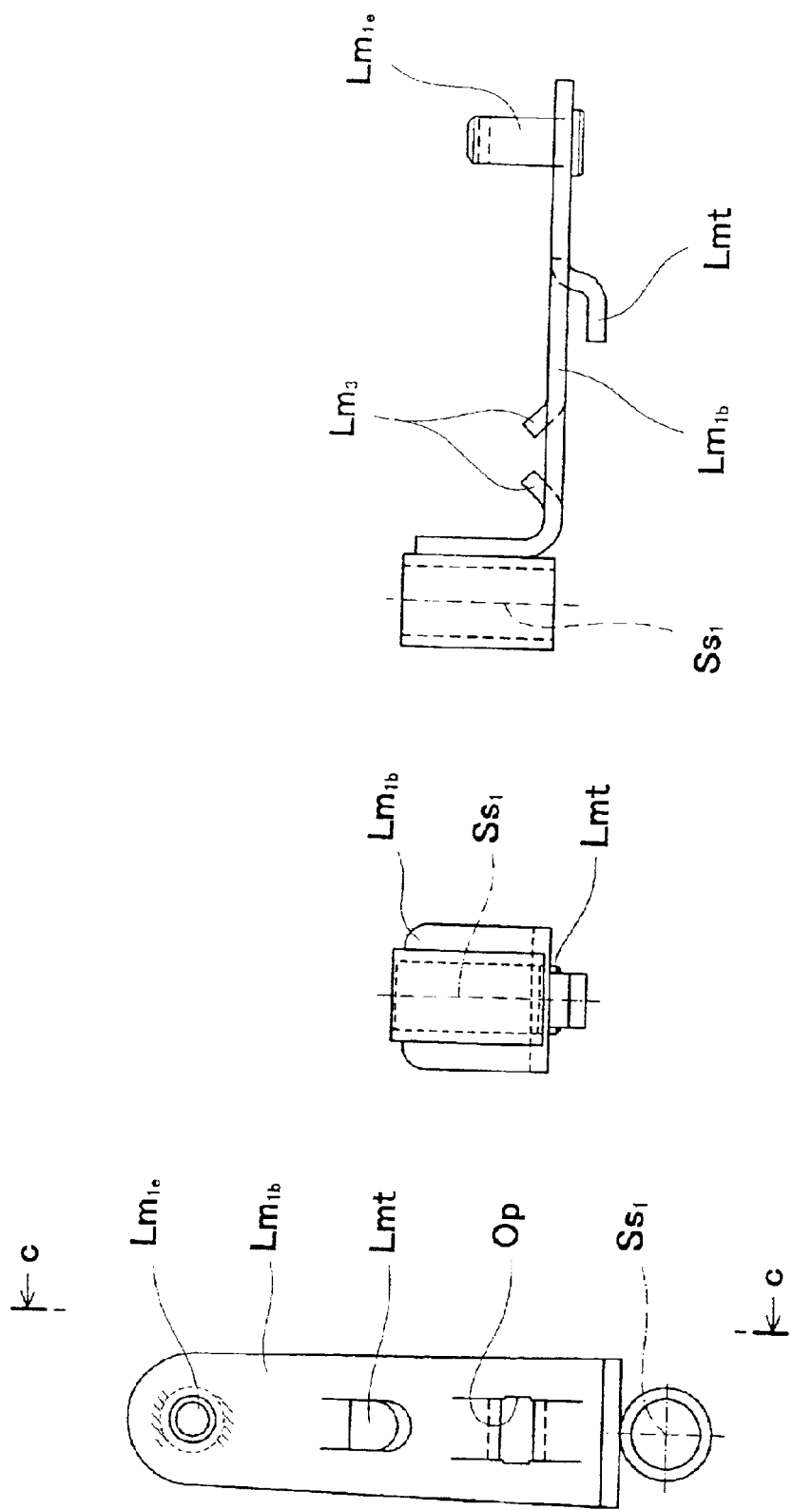
FIG. 9A is a plan view showing a second member of the first lever member of FIGS. 7A–7E.
FIG. 9B is a side view showing the second member of the first lever member of FIGS. 7A–7E.
FIG. 9C is a view taken in the direction of arrows substantially along line c—c of FIG. 9A and showing the second member of the first lever member of FIGS. 7A–7E.

In this embodiment, the first lever member Lm1 of FIGS. 7A–7C comprises a first member Lm1$a$ L-shaped in a plan view of FIGS. 8A–8C, and a second member Lm1$b$ of FIGS. 9A–9C provided so as to overlap with part of the first member Lm1$a$ substantially in a surface contacting relationship. As shown in FIG. 7A, the second member Lm1$b$ is engaged with the first member Lm1$a$ by means of an engagement portion Lmt and the first pivot Ss1 such that it is relatively movable (swingable) toward the direction indicated by an arrow Y of FIG. 7A. In the placement state of FIGS. 7A–7C, the first member Lm1$a$ and the second plate member Lm1$b$ are respectively provided with openings Op overlapping with each other as seen in a plan view. A coil spring Sc is disposed in the openings Op to bias the two members so as to be swingable toward the direction indicated by an arrow Y. The coil spring Sc is held from its outer periphery by means of a convex portion Lm13 and a convex portion Lm14 formed to provide openings Op.

As shown in FIGS. 7A, 7C, an attaching pin Lm1e is integrally provided on an upper surface of a tip end of the second member Lm1b to attach the wire Wp1 to the second member Lm1b.

A pipe member Lm5 is integrally provided on the side of the first member Lm1a which does not overlap with the second member Lm1b, to pivotally mount the second pivot Ss2 of the second lever member Lm2.

Figure 10A:
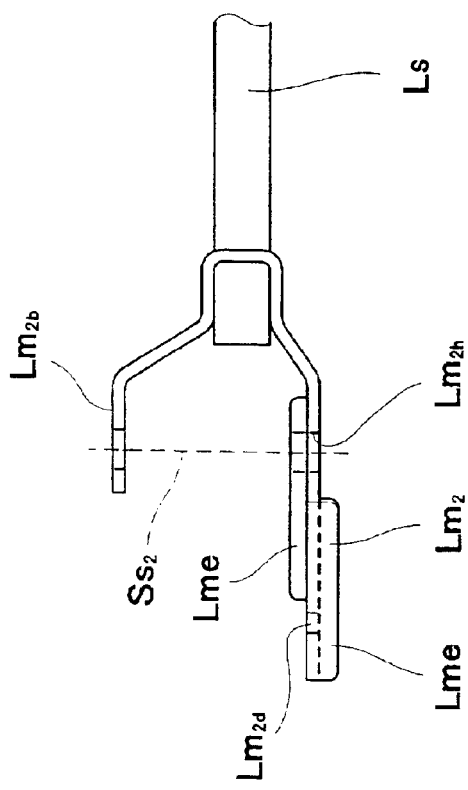
FIG. 10A is a plan view showing the second lever member of FIGS. 4–6, with a tip portion of a transmission lever portion omitted.
Figure 10B:
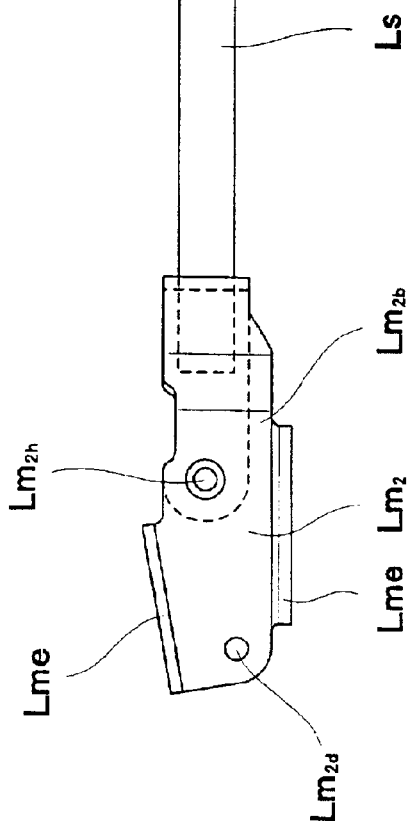
FIG. 10B is a side view showing the second lever member of FIGS. 4–6, with the tip portion of the transmission lever portion omitted.

As shown in FIGS. 10A, 10B, a base end portion of the operation lever Ls is integrally welded to a tip end side (right side in FIGS. 10A, 10B) of the second lever member Lm2. A portion Lm2b at the base end side of the second lever member Lm 2 (attaching side to the first member Lm1a) is two-forked. This two-forked portion Lm2b is provided with mounting holes Lm2h to connect the pipe member Lm5 (see FIG. 7A) of the first member Lm1a side to be pivotally mounted. The two-forked portion Lm2b is further provided with a mounting hole Lm2d at a base end side closer to a base end than the mounting holes Lm2h on the second lever member Lm2, to allow a lower end portion of the tie rod Tr (see FIG. 4) to be pivotally mounted. As shown in FIG. 4, in this embodiment, ball joints Bj are respectively provided at the lower end portion and an upper end portion of the tie rod Tr respectively connected to the third lever member Lm 3 and the second lever member Lm2 so as to have mechanically three-degree freedom.

Also, as shown in FIGS. 10A, 10B, the upper end Lme and the lower end Lme at the base end portion of the second lever member Lm2 are bent at a right angle with respect to the base portion Lm2c of the second lever member Lm2 without interference with the tie rod Tr for the purpose of rigidity.

Figure 11B:
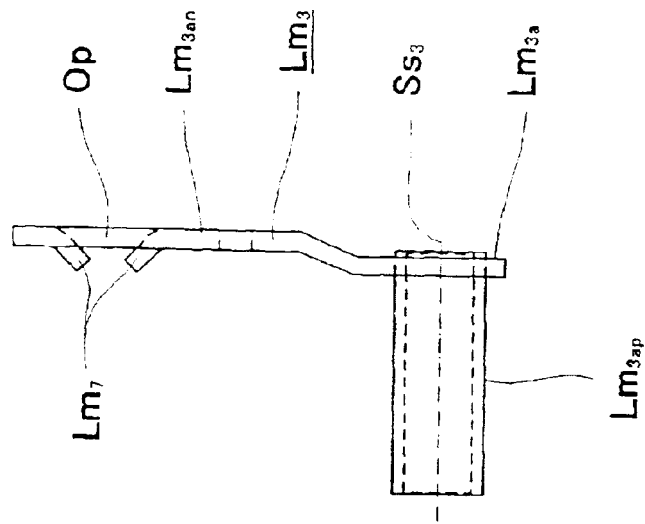
FIG. 11B is a view taken in the direction of arrows substantially along line b—b of FIG. 11A and showing the first member of the third lever member of FIGS. 4–6.
Figure 11A:
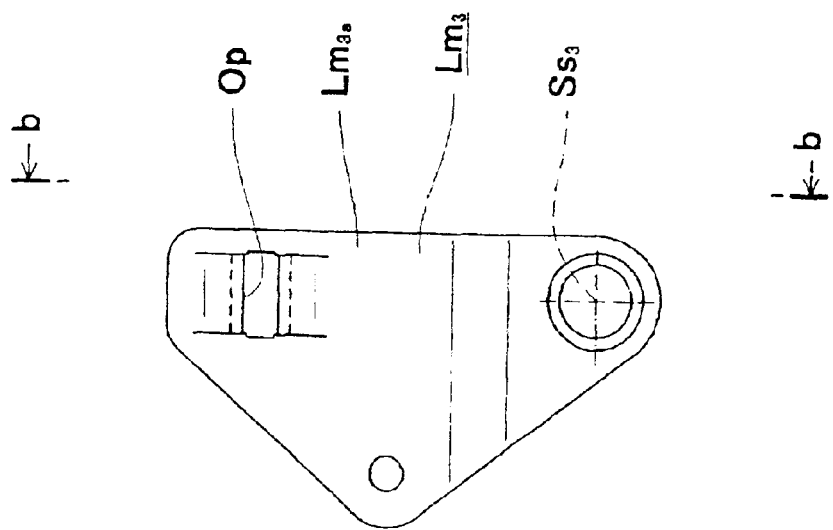
FIG. 11A is a side view showing a first member of a third lever member of FIGS. 4–6.
Figures 12A, 12B:
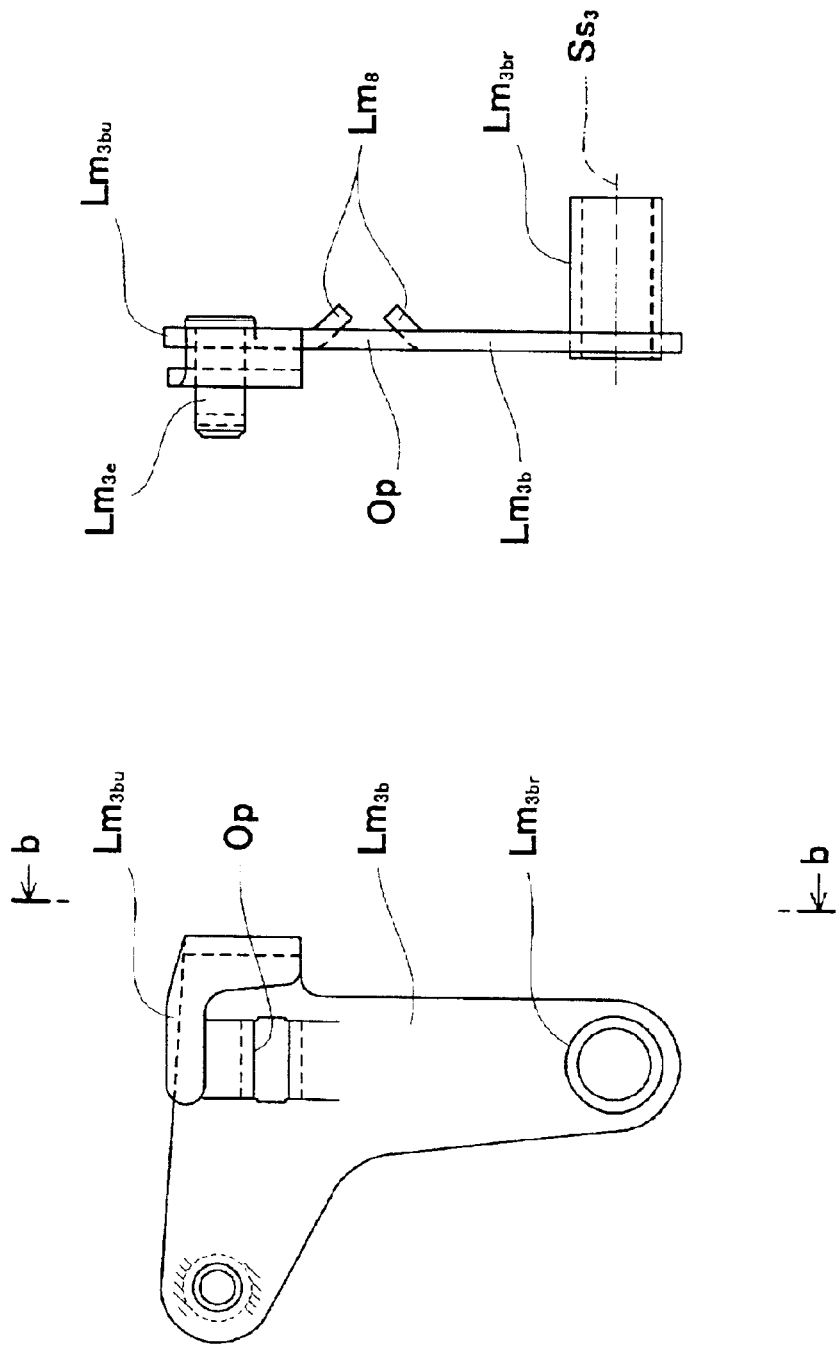
FIG. 12A is a side view showing a second member of the third lever member of FIGS. 4–6.
FIG. 12B is a view taken in the direction of arrows substantially along line b—b of FIG. 12A and showing the second member of the third lever member of FIGS. 4–6.

In this embodiment, the third lever member Lm3 comprises a first member Lm3a "inverted-L" shaped by providing a pipe member Lm3ap pivotally attached to the third pivot Ss3 and a plate member Lm3an vertically extending from a right end of the pipe member Lm3ap, as shown in FIGS. 11A, 11B, and a second member Lm3b of the third lever member Lm3 comprised of a bent portion Lm3bu provided so as to partially hold the first member Lm3a in such a manner that the bent portion Lm3bu and the plate member Lm3an of the first member Lm3a are in surface contact with each other, and a pipe member Lm3br pivotally attached to the third pivot Ss3 at a lower end of the second member Lm3b, as shown in FIGS. 12(A), 12(B). The second member Lm3b is engaged with the first member Lm3a by means of engagement at the bent portion Lm3bu provided at the second member Lm3b and the third pivot Ss3 such that it is relatively movable (swingable) toward the direction indicated by an arrow X of FIG. 4. Similarly to the constitution of the first lever member Lm1, the coil spring Sc is held by the first member Lm3a and the second member Lm3b. More specifically, in the placement of FIGS. 4–6, the first member Lm3a and the second member Lm3b (see FIG. 11A, 11B, 12A, 12B) are respectively provided with openings Op overlapping with each other as seen in a side view. The coil spring Sc is disposed in the openings Op to bias these two members to cause the openings Op to overlap with each other. The coil spring Sc is held from its outer periphery by means of a convex portion Lm7 and a convex portion Lm8 formed for provision of the opening Op.

An attaching pin Lm3e is, as shown in FIGS. 12A, 12B, integrally provided at an upper end portion of the second member Lm3b to attach the wire Wp2 to the second member Lm3b.

Figure 13A:
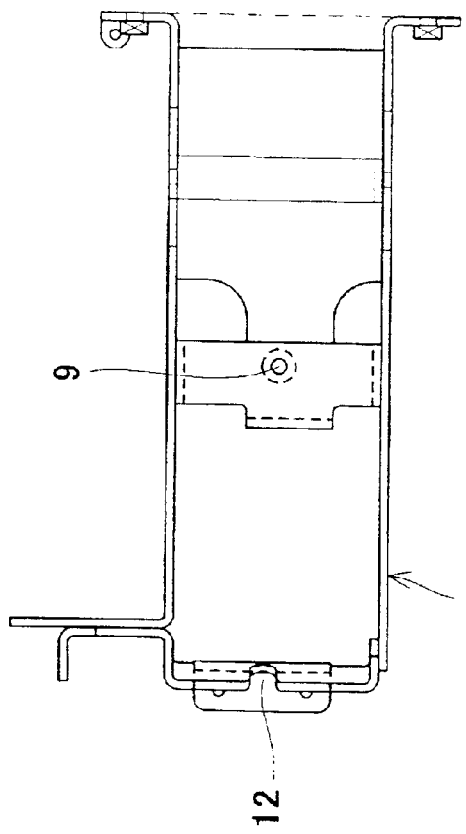
FIG. 13A is a plan view showing a unit frame of FIGS. 4–6.
Figure 13B:
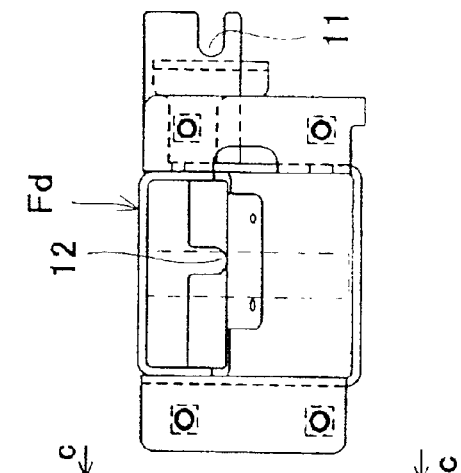
FIG. 13B is a side view showing the unit frame of FIGS. 4–6.
Figure 13C:
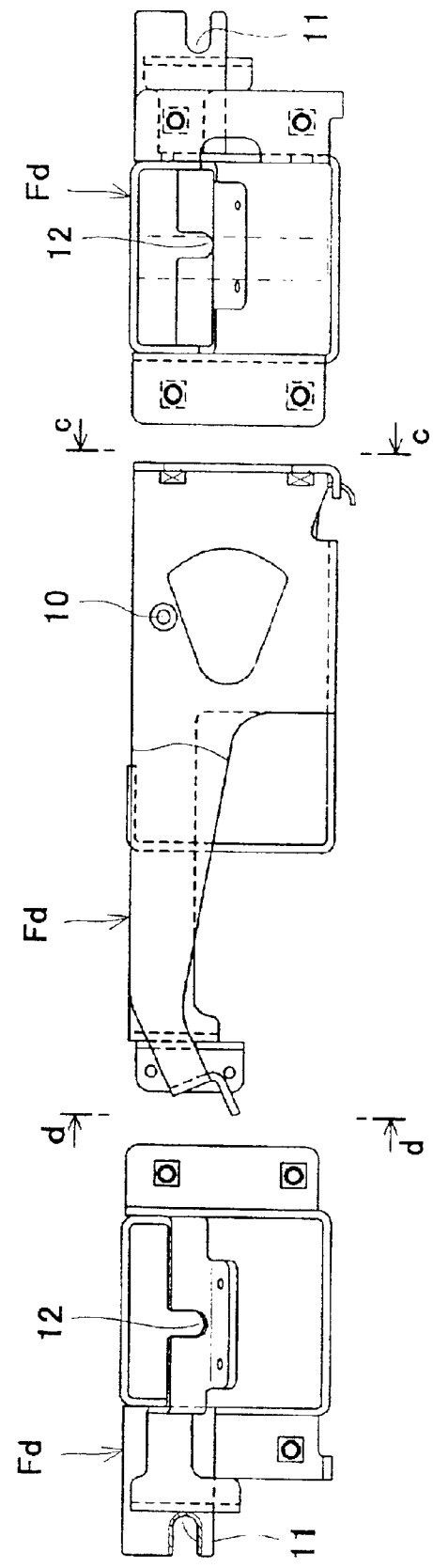
FIG. 13C is a view taken in the direction of arrows substantially along line c—c of FIG. 13B.
Figure 13D:
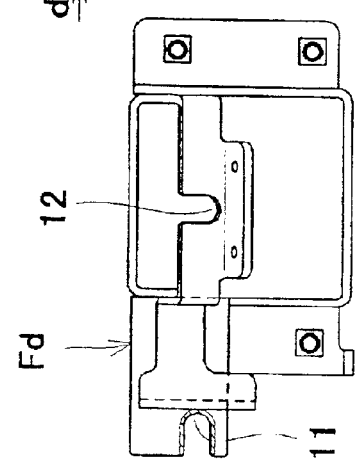
FIG. 13D is a view taken in the direction of arrows substantially along line d—d of FIG. 13B and showing the unit frame of FIGS. 4–6.

The unit frame Fd is, as shown in FIGS. 13A, 13B, provided with an attaching hole 9 for attaching an attaching pin 6 (see FIGS. 4–6) as the first pivot Ss1 and an attaching hole 10 for attaching an attaching pin 8 (see FIGS. 4–6) as the third pivot Ss3. These attaching holes 9, 10 are orthogonal to each other. The unit frame Fd is further provided with concave portions 11, 12 to which tip end portions of cable sheaths of the wires Wp1, Wp2 are fixed.

Figure 14:
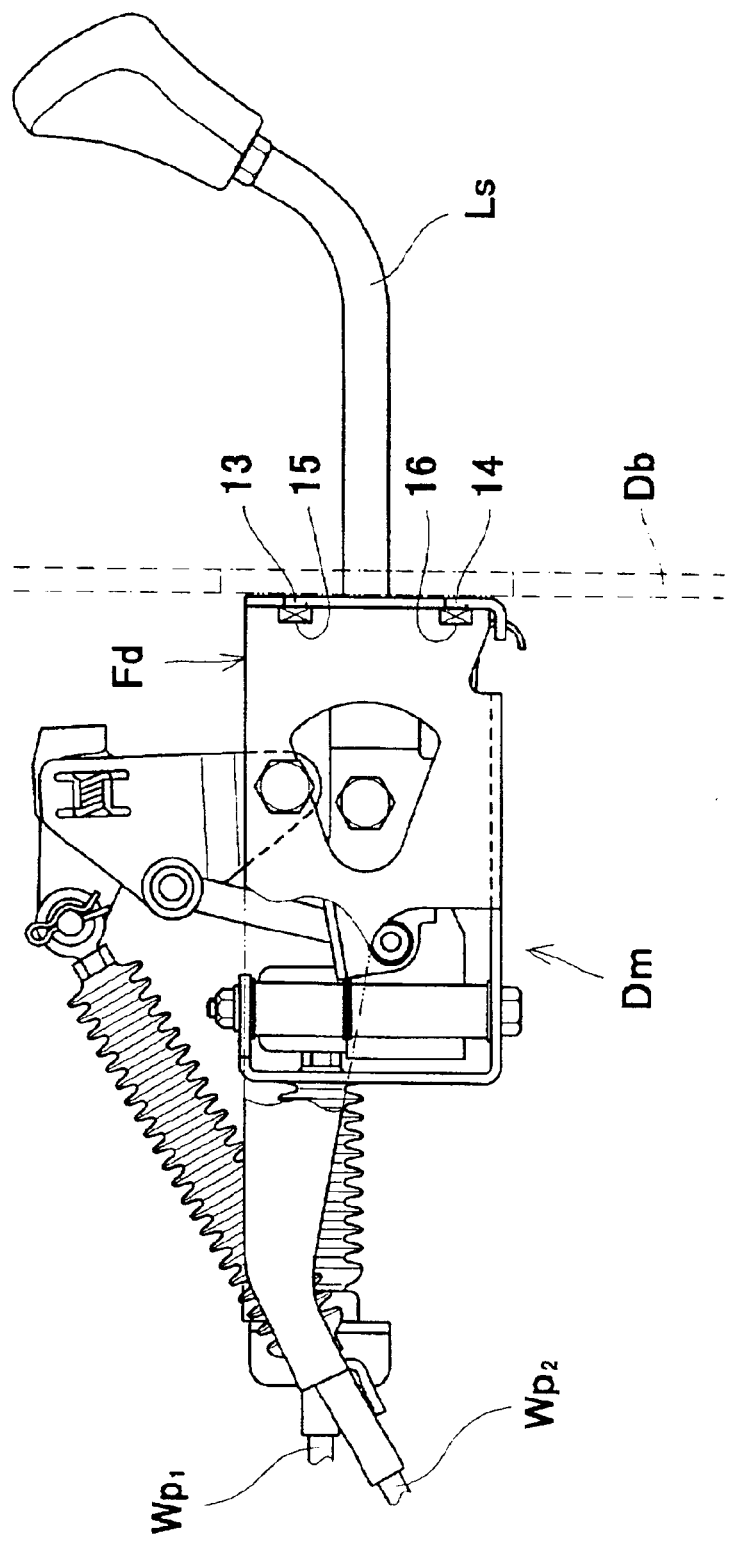
FIG. 14 is a side view showing the entire transmission lever unit of FIGS. 4–6 with the transmission lever and wires attached thereto.

As shown in FIG. 14, mounting holes 13, 14 and mounting nuts 15, 16 are provided at one end face of the unit frame Fd, for mounting of the unit frame Fd to the rear face of the dashboard Db.

Figure 15:
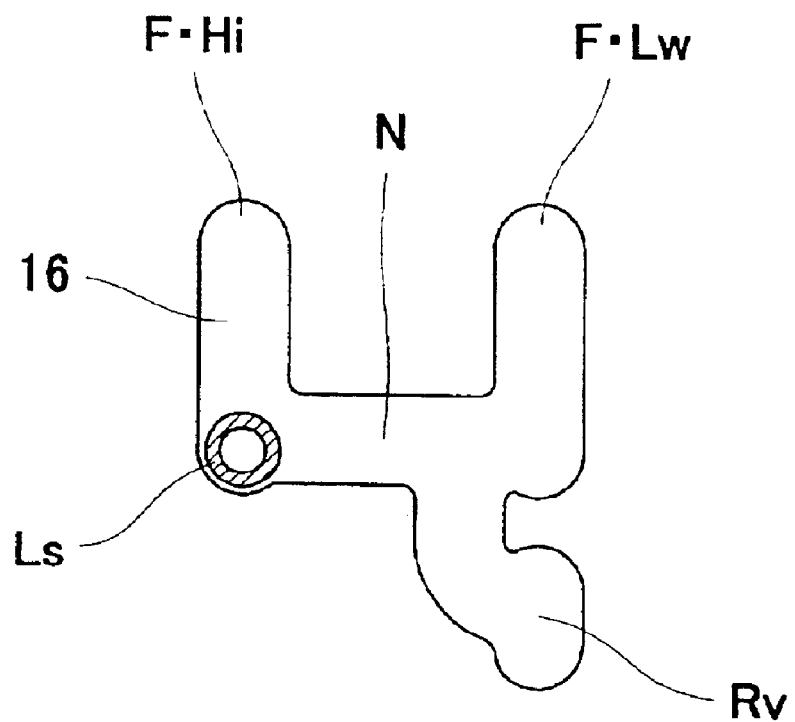
FIG. 15 is a view showing a plate provided with a gate pattern of the transmission lever unit of FIG. 14, seen from a driver's seat.

A plate provided with a gate pattern (groove conforming to a pattern of a shifting operation) shown in FIG. 15 is attached to the front surface of the dashboard Dc. In FIG. 15, Ls represents a shaft cross-section of the transmission lever Ls.

Subsequently, the function of the transmission lever unit Dm will be described in greater detail below.

As shown in FIG. 2, operator Or seated on driver's seat Dd holds the handle Hd with the left hand and operates lever Ls according to the gate pattern 16 of FIG. 15 with the right hand, thereby selecting "forward" or "reverse" and the gear ratio ("high-speed gear" or "low-speed gear"). More specifically, according to the gate pattern 16, operator Or shifts lever Ls from a neutral position N laterally provided at the center in the vertical direction, to the left-end side, and further upwardly, thereby selecting "forward F and high-speed gear Hi", while operator Or shifts lever Ls from the neutral position N, to the rightend side, and further upwardly, thereby selecting "forward F and low-speed gear Lw". Also, operator Or shifts lever Ls from the left side to the right side while downwardly pressing lever Ls, thereby selecting "reverse Rv".

By shifting lever Ls to select "forward F and high-speed gear Hi", in the transmission lever unit Dm, the first lever member Lm1 is swung clockwise around the first pivot Ss1 in FIG. 6 and then, the second lever member Lm2 is swung counterclockwise around the second pivot Ss2 in FIG. 4. Thereby, the third lever member Lm3 connected to the second lever member Lm2 by means of the tie rod Tr is swung counterclockwise around the third pivot Ss3 in FIG. 4. As a result, the wire Wp1 for selecting the "high-speed gear" or "the low-speed gear" is pulled (to the right side in FIG. 4) to allow the "high-speed gear" to be selected and the wire Wp2 for by selecting "forward" or "reverse" is pushed (to the left side in FIG. 4) to allow "forward gear" to be selected.

Meanwhile, by shifting the lever Ls to select the "forward and low-speed gear", in the transmission lever unit Dm, the first lever member Lm1 is swung counterclockwise around the first pivot Ss1 in FIG. 6, and then second lever member Lm2 is swung counterclockwise around the second pivot Ss2 in FIG. 4. Thereby, the third lever member Lm3 connected to the second lever member Lm2 by means of the tie rod Tr is swung counterclockwise around the third pivot Ss3 in FIG. 4. As a result, the wire Wp1 is pushed to allow "low-speed gear" to be selected and the wire Wp2 is pushed to allow "forward gear" to be selected.

Further, by shifting the lever Ls to select "reverse", in the transmission lever unit Dm, the first lever member Lm1 is swung counterclockwise around the first pivot in FIG. 6, and then the second lever member Lm2 is swung clockwise around the second pivot Ss2 in FIG. 4. Thereby, the third lever member Lm3 connected to the second lever member Lm2 by means of the tie rod Tr, is swung clockwise around the third pivot Ss3 in FIG. 4. As a result, the wire Wp1 is pulled to allow "low-speed gear" to be selected and the wire Wp2 is pulled to allow "reverse gear" to be selected. In case of the transmission of this embodiment, the gear train for selecting "forward" or "reverse" and the gear train for selecting "high-speed gear" or "low-speed gear" are comprised of independent gear trains, and therefore, when "reverse" is selected, this operation for selecting the reverse gear does not affect the already selected high-speed or low-speed gear.

In the above-identified shifting operation in the transmission lever unit Dm of this embodiment, because the connected portion of the second lever member Lm2 and the tie rod Tr is located in the vicinity of the first pivot Ss1, the wire Wp2 is maintained at a predetermined condition during the operation for selecting "high-speed gear" or "low-speed gear".

In addition, because the second lever member Lm2 and the third lever member Lm3 are connected by means of the tie rod Tr comprising the ball joint mechanisms Bj at both ends. Therefore, without a need for connecting structure having so-called "play", the lever member Lm2 and the third lever member Lm3 can be smoothly operated even if the attaching positions at both ends three-dimensionally vary.

In this embodiment, since the first lever member Lm1 and the third lever member Lm3 are each comprised of two members and the coil spring Sc is interposed between these two members, the shifting operation makes the operator Or feel good.

In the "mounting structure of the coil spring Sc" employed in the embodiment, the members between which an elastic member (coil spring Sc) is interposed are simply provided with the openings OP and the convex portions for prevention of the disengagement of the coil spring Sc are provided at the outer periphery of the openings Op. Thus, the mounting structure reliably holding the coil spring Sc, can be attained in a very simple manner. The openings and the convex portions can be simply pressed by one pressing. While the convex portion is formed by the two opposed bent portions, their tip end portions may be integrally connected to each other.

The "mounting structure of the coil spring sc" is not limited to the mounting structure applied to the transmission lever unit, but can be, as a matter of course, employed in mounting structures of coils of another units. Also, the members are not limited to the aforesaid two plate members but any other types of two members may be employed provided that these members are substantially parallel to each other.

Subsequently, the schematic constitution of the small four-wheeled utility vehicle V of FIG. 1 comprising the above-mentioned transmission lever unit will be described with reference to FIGS. 2–3. The periphery except beneath seat S located at the front of vehicle V is surrounded by pipe frame 53. The pipe frame 53 is comprised of a pipe 53a and a pipe 53b. The pipe 53a located behind the seat S and vertically provided on the left side is connected to an intake port 13 provided in a cover C of the belt converter B by means of a connecting tube or the like (not shown), for supplying air containing little dust. The pipe 53b located behind the seat S and vertically provided on the right side is connected to an air-intake port of a carburetor (not shown) of the engine E via an air cleaner and a connecting tube 54a placed beneath the seat S.

A luggage deck 56 to be loaded with luggage is provided behind the seat S and swingable around a swing shaft 56a of FIG. 2 as indicated by an arrow R to damp the luggage.

The engine E integrally provided with the belt converter B is mounted below a floor face F of the luggage deck 56. The transmission Tm is placed behind the engine E and a muffler M is provided behind the transmission Tm. The muffler M is connected to an exhaust port of the engine E by means of an exhaust pipe 59, for muffling an exhaust gas from the engine E and discharging the resulting gas to the outside.

While description has been given of the transmission lever unit applied to the small four-wheeled utility vehicle of FIGS. 1–3, this unit may be, as a matter of course, applied to various types of vehicles, e.g., a straddle-type small four-wheeled leisure vehicle. In that case, the same functions and effects are attained.

Also, the description has been given exclusively of the transmission lever unit comprising the gear train of "forward" and "rearward" and the gear train of "high-speed gear" and "low-speed gear" which is independent of the former gear train. Alternatively, a gear train of "forward" and "reverse" (or a gear train of "high-speed gear" and "low-speed gear") and a gear train of "4WD" and "2WD," which is independent of the former gear train, may be adopted.

Numerous modifications and alternative embodiments of the invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention and all modifications which come within the scope of the appended claims are reserved.

What is claimed is:

1. A transmission lever unit for a vehicle, mounted at a position spaced apart from a transmission of the vehicle, the transmission lever unit being adapted to select a gear train of the transmission through first and second connecting means connected to the transmission, by an operation of a single transmission lever, the transmission lever unit comprising:

a frame;

a first lever member mounted on the frame and configured to be swingable around a first pivot provided on the frame, the first lever member being connected to the first connecting means;

a second lever member fixedly mounted to the single transmission lever to be movable together with the single transmission lever, and configured to be swingable around a second pivot provided on the first lever member, the second pivot being placed such that an axial direction thereof is substantially orthogonal to an axial direction of the first pivot, the second lever member being connected to the first lever member through the second pivot to be swingable around the first pivot;

a third lever member mounted on the frame and configured to be swingable around a third pivot provided on the frame and placed substantially in parallel to the second pivot, the third lever member being connected to the second connecting means; and a connecting member connecting a portion of the second lever member which is spaced apart from the second pivot to a portion of the third lever member which is spaced apart from the third pivot;

wherein the first lever member is operated by a swing operation of the single transmission lever around the first pivot to cause the first connecting means to operate to select the gear train of the transmission; and wherein the second lever member is operated by a swing operation of the single transmission lever around the second pivot to cause the third lever member to operate via the connecting member to cause the second connecting means to operate to select the gear train of the transmission.

2. The transmission lever unit for a vehicle according to claim 1, wherein a tip end portion of the first connecting means is connected to a portion of the first lever member that is apart from the first pivot and a tip end portion of the second connecting means is connected to a portion of the third lever member that is apart from the third pivot.

3. The transmission lever unit for a vehicle according to claim 1, wherein the connecting member is comprised of a rigid member, and connecting elements having three degrees of freedom are respectively disposed at a connected portion of the connecting member and the third lever member and at a connected portion of the connecting member and the second lever member.

4. The transmission lever unit for a vehicle according to claim 3, wherein the connecting elements are a ball joint mechanism.

5. The transmission lever unit for a vehicle according to claim 1, wherein the first pivot is provided substantially vertically and the second pivot is substantially horizontal.

6. The transmission lever unit for a vehicle according to claim 1, wherein at least one of the first lever member, the second lever member, and the third lever member is comprised of a first plate member and a second plate member coupled to each other by means of elastic means, the first plate member and the second plate member are provided to be independently swingable around one of the first, second, and third pivots, and the first and second plate members are connected to each other through an elastic member.

7. The transmission lever unit for a vehicle according to claim 6, wherein the first plate member and the second plate member respectively provided with openings overlapping with each other as seen from one direction, and the elastic means is formed by a spring disposed in the openings.

8. The transmission lever unit for a vehicle according to claim 7, wherein the openings of the first plate member and the second plate member have substantially equal length.

9. The transmission lever unit for a vehicle according to claim 7, wherein the spring is a coil spring, a convex portion for prevention of disengagement of the spring toward an opposite side of the second plate member is provided at a portion of the opening of the first plate member so as to extend toward the opposite side of the second plate member and a convex portion for prevention of disengagement of the spring toward an opposite side of the first plate member is provided at a portion of the opening of the second plate member so as to extend toward the opposite side of the first plate member.

10. The transmission lever unit according to claim 9, wherein the convex portion is formed by two opposed bent portions.

11. The transmission lever unit according to claim 10, wherein the coil spring is held from its outer periphery by the convex portions provided at the openings of the first plate member and the second plate member.

12. The transmission lever unit according to claim 9, wherein the coil spring is held from its outer periphery by the convex portions provided at the openings of the first plate member and the second plate member.

13. The transmission lever unit for a vehicle according to claim 1, wherein the gear train selected through the first connecting means is for changing a gear ratio, and the gear train selected through the second connecting means is for switching between forward and reverse.

* * * * *